United States Patent [19]

MacPherson et al.

[11] 4,257,517
[45] Mar. 24, 1981

[54] SCRAPER BARS FOR USE WITH CONVEYOR BELTING AND THE LIKE

[75] Inventors: Edwin J. MacPherson, Elmira; Peter J. Alderson, Dollard-des-Ormeaux; Douglas A. Skinner, Bellwood, all of Canada

[73] Assignee: Uniroyal Ltd., Don Mills, Canada

[21] Appl. No.: 748,259

[22] Filed: Dec. 6, 1976

[51] Int. Cl.³ .............................................. B65G 45/00
[52] U.S. Cl. ................................. 198/497; 15/256.6
[58] Field of Search ............... 198/497, 499, 599, 635, 198/637; 15/236 R, 236 A, 245, 256.5, 256.51, 256.6; 74/230; 156/84; 264/251, 255, 275; 428/913

[56] References Cited

U.S. PATENT DOCUMENTS

| 1,684,477 | 9/1928 | Demand | 15/245 |
| 2,139,054 | 12/1938 | Wilson | 264/255 |
| 2,759,606 | 8/1956 | Nippert | 198/497 |
| 3,560,171 | 2/1971 | Ornstein et al. | 428/913 |
| 3,973,845 | 8/1976 | Lindblad et al. | 15/256.5 |

Primary Examiner—Joseph E. Valenza
Attorney, Agent, or Firm—Norbert P. Holler; Marcus J. Millet; Steven H. Bazerman

[57] ABSTRACT

A scraper bar for use with conveyor belting and the like to clean such belting of material adhering to its surface. The scraper bar consists of a layer of hard abrasion-resistant pellets embedded in an elastomer to form an elastomer/pellet matrix. An additional layer of elastomer is cast to the matrixed layer to provide a surface for attaching the scraper to its support when in service. Embedded in the layer of unmatrixed elastomer is an insert of particle board, chipboard, plywood or fibreglass reinforced plastic sheeting. The insert prevents bowing of the scraper bar due to differential shrinkage between the layer of matrixed elastomer and pellets and the supporting layer of elastomer.

9 Claims, 10 Drawing Figures

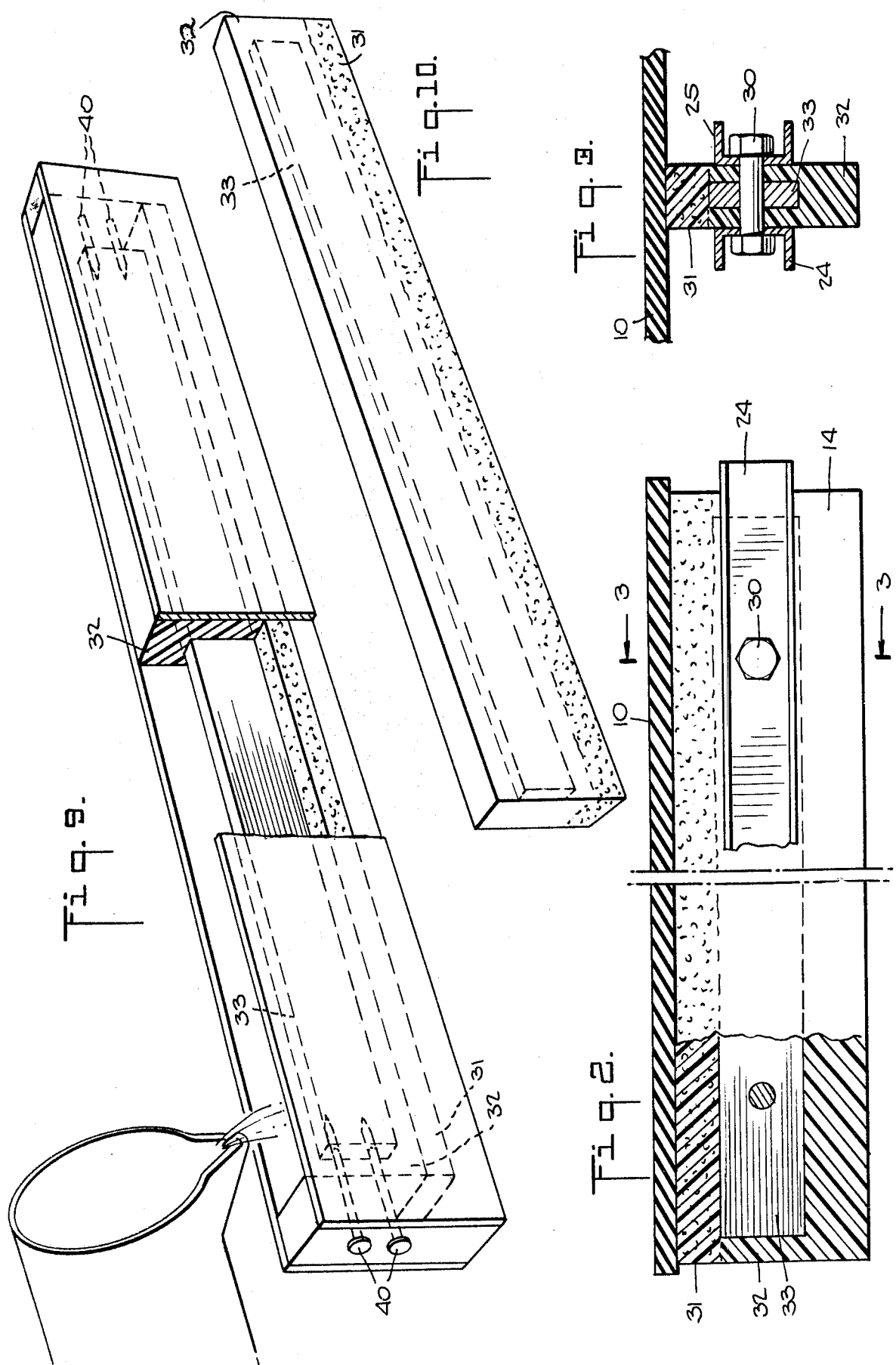

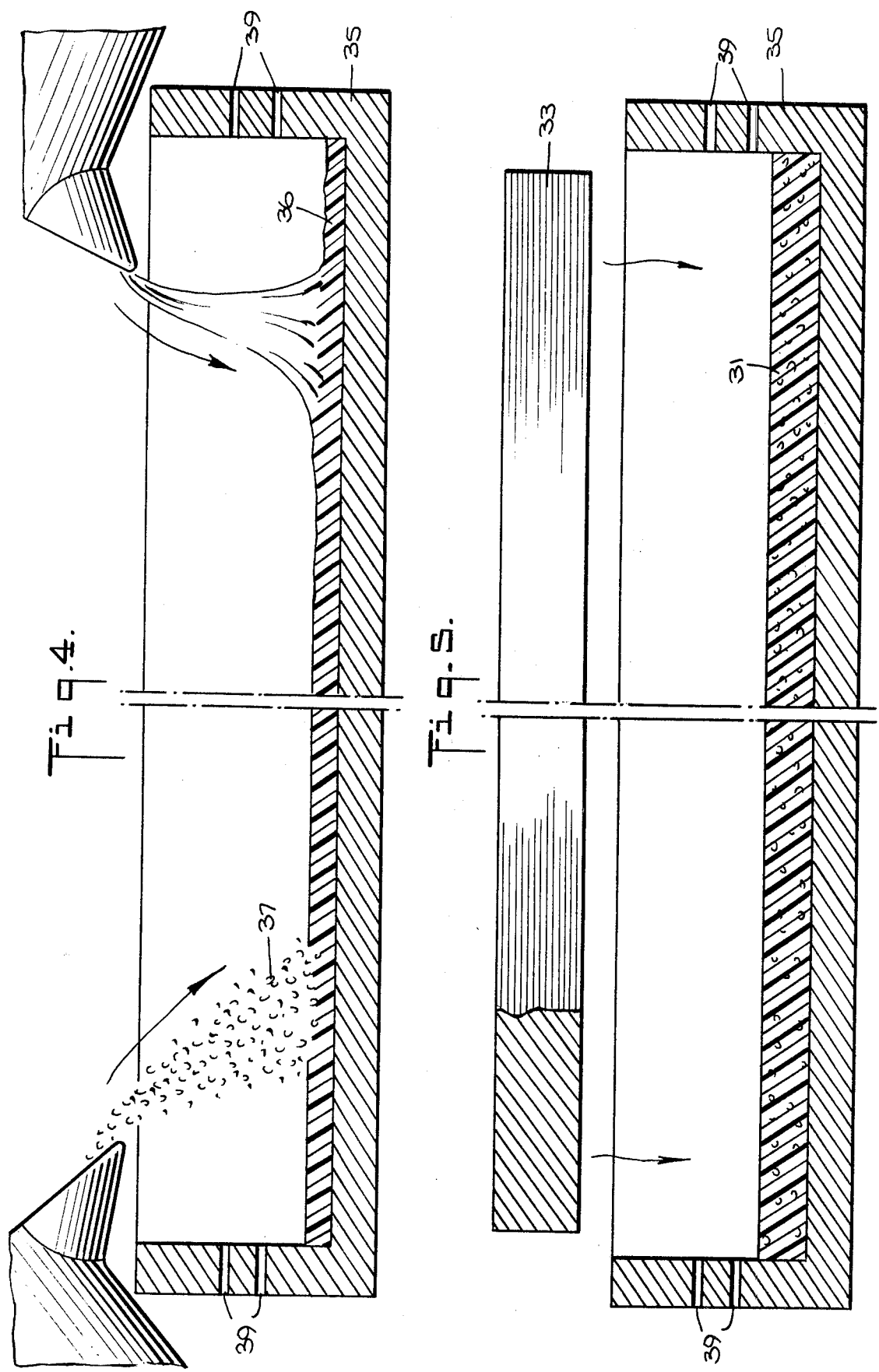

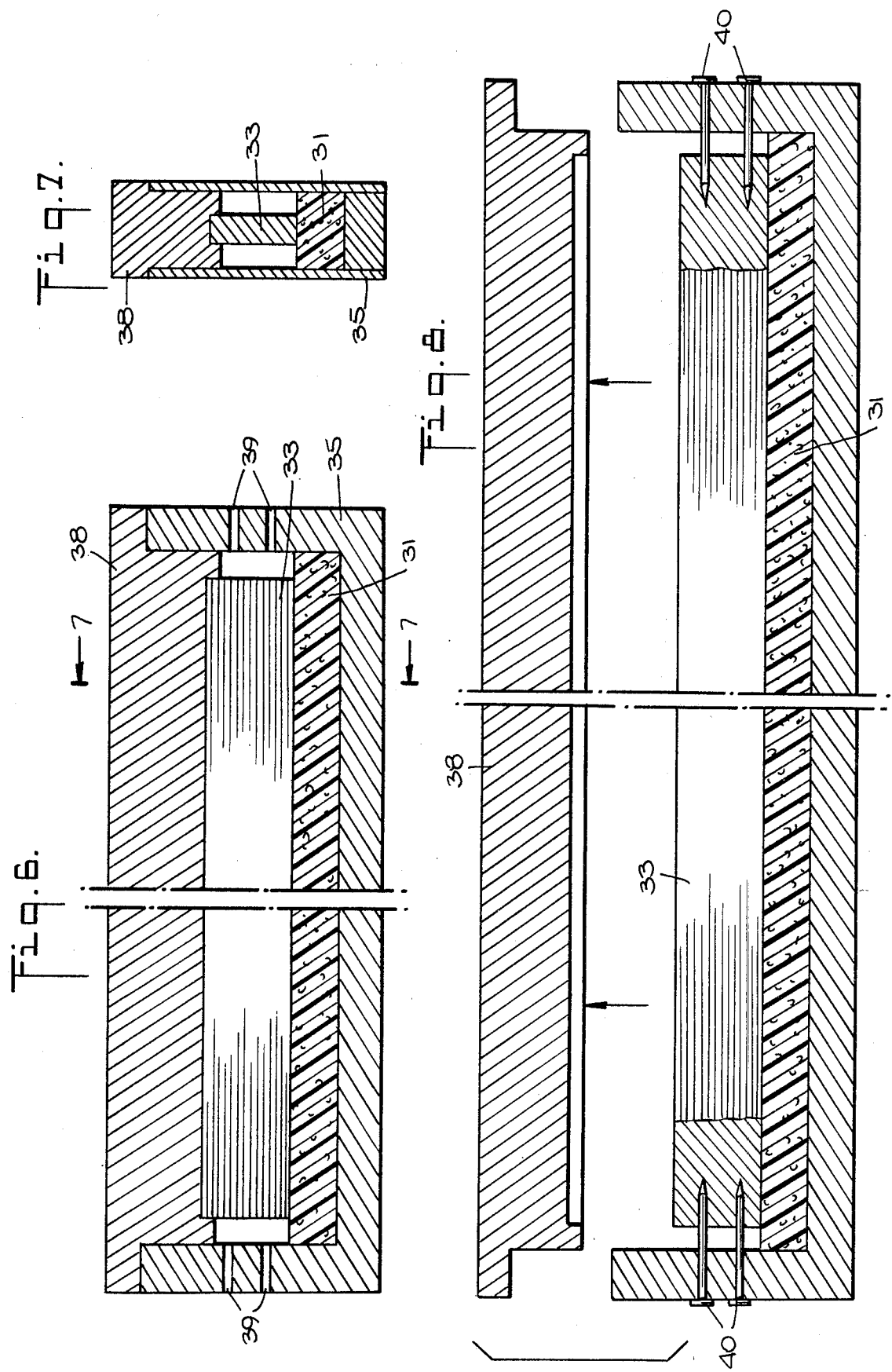

SCRAPER BARS FOR USE WITH CONVEYOR BELTING AND THE LIKE

BACKGROUND OF THE INVENTION

This invention relates to scraper bars for conveyor belting and the like and more particularly to scraper bars having a layer of hard abrasion-resistant pellets embedded in an elastomer.

When conveyor belting is used to transport granular material, it is necessary to wipe the conveyor belting surface with a blade or the like to remove any such material which may adhere to the belting. Such blades, called scraper bars, have been used for many years and have been formed from various materials, including various rubbers and urethanes.

To get good scraping or cleaning action, the scraper bar must bear directly against the conveyor belting. If the scraper bar bears properly, it quickly wears out. As an example, a rubber scraper bar (Hardness 60, Shore A) forming part of a plow removing bauxite was seen to wear by $\frac{1}{8}''$ in a 12-hour period when it was sufficiently pressed to the conveyor belting to ensure good scraping action. While urethane scraper bars do improve wear resistance, they do not always last sufficiently longer that their extra cost can be justified by the user.

Recently, to overcome this wear problem, there has been introduced in the market scraper bars consisting of a layer of hard abrasion-resistant ceramic pellets embedded in a cast urethane or other elastomer to form an elastomer/pellet matrix. An additional layer of elastomer is cast to the matrixed layer to provide a place for attaching the scraper bar to a support when it is in service. These pellets are formed from a very hard, abrasion-resistant material such as ceramic, which allows long term wear without injury to the conveyor belting.

During manufacture of such a scraper bar, a mold made of aluminum, steel or other suitable rigid material is utilized. A layer of freshly mixed elastomer, such as urethane polymer, is cast directly into the bottom of the mold and a predetermined quantity of suitable pellets such as those formed from a ceramic material are added. The pellets should be treated with an adhesive bonding agent to fix them firmly in the elastomer. The pellets are mixed intimately with the elastomer, and the matrixed layer thus formed is then leveled before the elastomer begins to gel. The remainder of the mold is then filled with a freshly mixed elastomer formulation and the entire bar is cured at an elevated temperature. After curing, the finished scraper bar is demolded.

When a scraper bar is made in this fashion and allowed to cool and equilibrate for several days, the scraper bar thus formed bows. The bowing is particularly noticeable in scraper bars longer than twelve inches in length. The bowing reduces the amount of contact between the scraper bar and the conveyor belting surface being cleaned and thus renders scraper bars greater than twelve inches unacceptable for use in cleaning conveyor belting. The bowing can be overcome to a certain extent by applying pressure on the extreme top ends of the scraper bar. This technique results in the application of extreme force to the scraper bar with resulting excessive and uneven wear patterns.

BRIEF SUMMARY OF THE INVENTION

In an effort to overcome this tendency towards bowing, it was discovered by the inventors herein that the layer of matrixed pellets and elastomer exhibited negligible shrinkage after demolding, while the elastomer layer appreciably shrank, and that the bowing was caused by this differential shrinkage. For example, when the elastomer used was urethane, the urethane layer shrank approximately 1½ to 2% after demolding, while the matrixed layer exhibited essentially no shrinkage.

In accordance with the present invention the differential shrinkage may be compensated for by incorporating an insert of particle board, chipboard, plywood or fibreglass reinforced plastic sheeting in the unmatrixed layer of elastomer at or near the edge of its interface with the layer formed by the matrix of pellets and elastomer. The insert must be sufficiently stiff to resist the differential shrinkage, yet neither so stiff nor so sharp that, if exposed due to failure of a scraper bar, the conveyor belting will be harmed.

BRIEF DESCRIPTION OF THE DRAWINGS

The present invention will become more readily apparent from the following description and drawings, in which:

FIG. 2 is a partially cut away front view of the scraper bar of the present invention shown in combination with a support member taken at plane 2—2 of FIG. 1 in the direction of the arrows;

FIG. 3 is a sectional view at plane 3—3 of FIG. 2 in the direction of the arrows showing the scraper bar of the present invention attached to its support member and positioned against the conveyor belting;

FIG. 4 is a sectional view of the mold in which the scraper bar of the present invention is manufactured showing the initial layer of elastomer and pellets being intermixed;

FIG. 5 is a sectional view of the mold in which the scraper bar of the present invention is manufactured, showing the positioning of the support member in such a mold after the elastomer/pellet matrix has been formed;

FIG. 6 is a sectional view of the mold in which the scraper bar of the present invention is manufactured, showing the means for initially positioning the support member within the mold;

FIG. 7 is a cross sectional view of the partially filled mold of FIG. 6 taken at plane 7—7 in the direction of the arrows;

FIG. 8 is a sectional view of the mold in which the scraper bar of the present invention is manufactured, showing the final positioning and attaching of the support member in the mold and the removal of the means for initially positioning the support member in the mold;

FIG. 9 is a partially cut away perspective view of the mold in which the scraper bar of the present invention is manufactured, showing the casting of the final layer of unmatrixed elastomer; and FIG. 10 is a perspective view showing a fully molded scraper bar in accordance with the present invention.

DETAILED DESCRIPTION OF THE INVENTION

Figure 1:
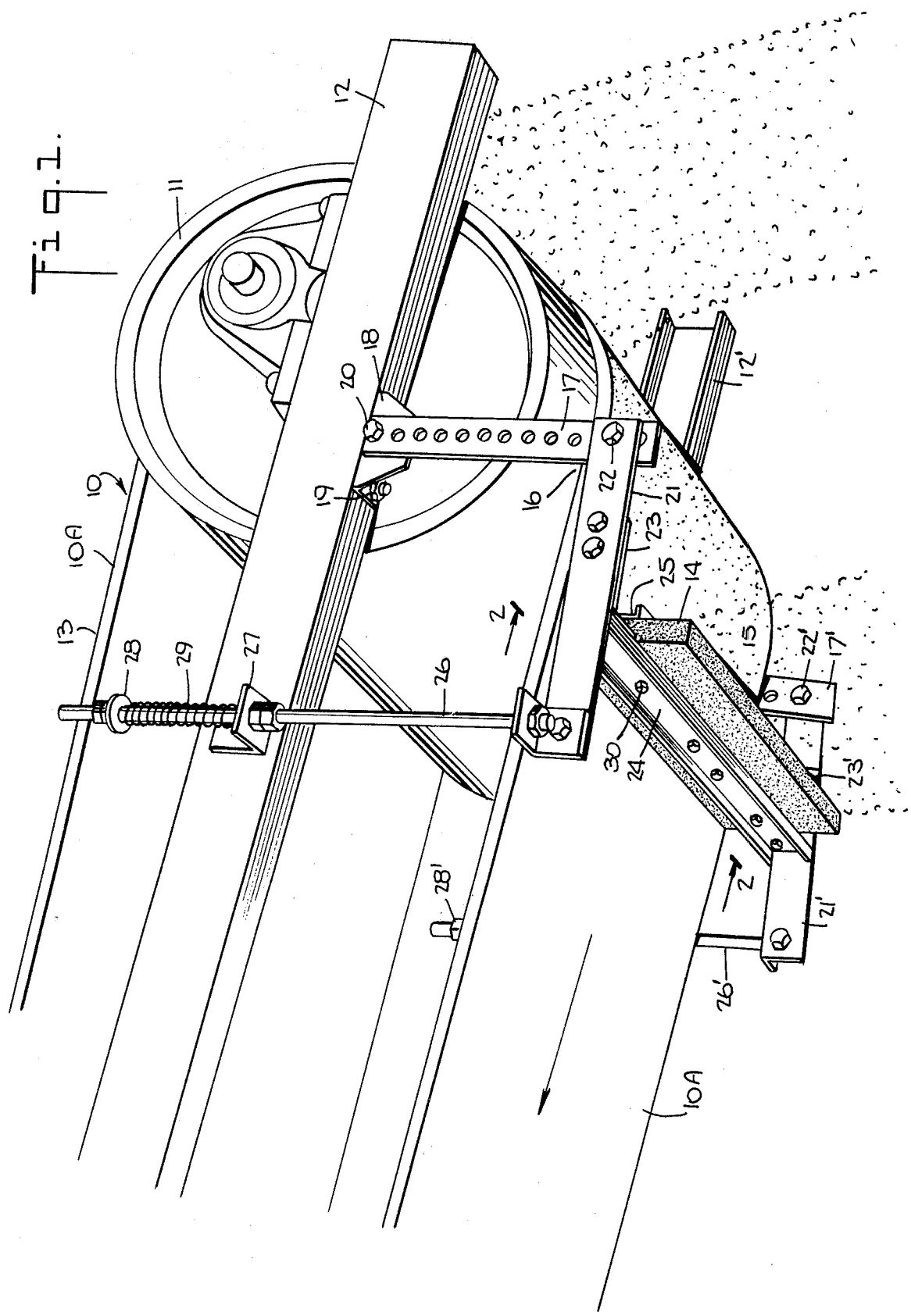
FIG. 1 is a perspective view of a conveyor belt with a scraper bar in accordance with the present invention used in conjunction therewith.

FIG. 1 discloses a conveyor belt 10 positioned about drum 11 which is rotatably mounted on the support members 12 and 12'. The granular material 13 to be conveyed by the conveyor 10 is positioned on the upper surface 10A of the conveyor belt 10. As the conveyor belt 10 passes around the drum 11, the granular material 13 falls from the conveyor belt surface 10A. Some of the particles of the material 13 may adhere to the conveyor belt surface 10A. To eliminate any accumulation of particles on the conveyor belt, it is necessary to remove any such particles adhering to surface 10A by means of a scraper bar 14 held in position and pressed against the conveyor belt surface 10A by positioning means 16.

The scraper bar 14 removes any adhereing material 13 by scraping it from the conveyor belt surface 10A.

Positioning means 16 includes support bars 17 and 17' attached to their respective support members 12 and 12' by clips 18 and 18' (clip 18' not shown). Clip 18 is attached to its support member 12 by bolts 19 and to the support bar 17 by bolt 20. Clip 18' is similarly attached by bolts 19' and 20' (not shown). Arms 21 and 21' are pivotably attached to their respective support bars 17 and 17' by means of hinges 22 and 22'.

The scraper bar 14 is positioned and attached between arms 21 and 21' by L-shaped plates 23 and 23' in combination with positioning bar 24 and backing bar 25. As can be seen from FIGS. 1, 2 and 3 the scraper bar 14 is attached to positioning bar 24 and backing bar 25 by several nuts and bolts 30 positioned along the length of the scraper bar 14. The arms 21 and 21' are attached to tension rods 26 and 26' at their respective ends opposite to where they are attached to their support bars 17 and 17'. The tension rods 26 and 26' pass through centering clips 27 and 27' which are attached to support members 12 and 12'. The ends of tension rods 26 and 26' are capped by nuts and washers to form spring stops 28 and 28'. Positioned about tension rods 26 and 26', respectively, between centering clips 27 and 27' and their respective spring stops 28 and 28', are compression springs 29 and 29' (spring 29' not shown). The springs 29 and 29' are of sufficient length to be held under compression by their respective clips 27 and 27' and their spring stops 28 and 28'. Accordingly the springs 29 and 29' act to pull arms 21 and 21' toward the coneyor belt 10 and thus keep scraper bar 14 under pressure and in contact with the surface 10A of conveyor belting 10.

In operation a scraper bar 14 so positioned acts to remove any excess material which has remained on the conveyor belt 10 as it passes around drum 11. While the scraper bar 14 is shown positioned across the outer surface of the conveyor belt 10, for certain uses it may equally be positioned on the inner surface or two such bars may be used together to form a wedge or plow, positioned either on the inner or outer surface of the conveyor belt 10.

The scraper bar 14 of the present invention as shown in FIG. 9 consists of a layer 31 of an elastomer such as an urethane polymer or a like material in combination with small pellets of hard abrasion resistant material. Integrally formed with such a matrixed layer of pellets and elastomer is a layer 32 of elastomer such as urethane, rubber or the like. Embedded in the elastomer layer 32 is an elongated member 33 formed from material sufficiently rigid to prevent bowing due to differential shrinkage between the layers 31 and 32. The elongated member 33 should not, however, be so shaped or so rigid as to cause injury to the conveyor belt 10 if it becomes exposed. Suitable materials for forming such an elongated member would be particle board, chipboard, plywood or fibreglass reinforced plastic sheeting.

Bolts 30 which attach the scraper bar 14 to positioning bar 24 and backing bar 25 pass through holes in the elongated member 33. Such holes are drilled in a completed scraper bar 14 prior to its attachment to the positioning and backing bars 24 and 25.

As can be seen in FIGS. 4 through 9 a scraper bar 14 in accordance with the present invention is manufactured by the use of a mold 35 made of aluminum, steel, or other suitable rigid material. A layer of freshly mixed elastomer 36 such as an urethane formulation is poured directly into the bottom of the mold 35 and a predetermined quantity of pellets is added. The pellets should be small in size (in the order of $\frac{1}{8}''$ diameter) and should be treated with an adhesive coating suitable for bonding the pellets firmly to the elastomer. The pellets are intimately mixed with the elastomer and the resulting mixture is then leveled before the elastomer begins to gel. A layer 31 of a matrix of pellets and elastomer is thus formed.

In accordance with the present invention, to prevent bowing from differential shrinkage between the matrixed layer 31 and the layer of elastomer 32, the rigid elongated member 33 formed from particle board, chipboard, plywood or fibreglass reinforced plastic sheeting is then positioned on top of the matrixed layer 31. This elongated member may be pretreated with a suitable adhesive to insure its bonding to the elastomer. As shown in FIG. 6, the elongated member 33 is held in position by a temporary positioning member 38 which is of a shape to hold elongated member 33 in alignment with holes 39 in the mold 35. Once the elongated member 33 is properly positioned by positioning member 38, pins or nails are driven through holes 39 into the elongated member 33 holding it firmly in place. Alternatively elongated member 33 may be initially positioned by hand.

Thereafter as seen in FIG. 8, the temporary positioning member 38 is removed and an elastomer formulation is cast in the mold on top of the previously prepared matrix layer 31. After the resulting mixture is cured at an elevated temperature, the pins or nails 40 are removed and a finished scraper bar 14 in accordance with the present invention is molded.

As a specific example, a scraper bar 14 in accordance with the present invention was manufactured having the dimensions of 1 in. by 4 in. by 28 in. by casting 1.22 lb. freshly mixed Vibrathane V6004 (a trade name for an isocyanate-terminated polyurethane prepolymer manufactured by Uniroyal, Inc.) cured with MOCA (a trade name for methylene-bis(o-chloroaniline) manufactured by E. I. du Pont and Co. Inc.)) in the bottom of a preheated mold. Then 1.9 lb. adhesive coated MTLX pellets (the trade name of abrasion-resistant ceramic pellets manufactured by Coors Porcelain Co.) were added. The urethane and pellets were mixed thoroughly with a spatula and the matrix layer thus formed leveled. A piece of particle board $\frac{1}{2}$ in. by $\frac{3}{4}$ in. by 27 in. which had been primed with a suitable adhesive was then placed in the mold and pinned as described. The remainder of the urethane formulation, approximately 2.98 lb., was then poured into the mold until full. The mold was then placed in an oven at 100° C. for approximately one hour to effect a cure. The resulting scraper bar was removed from the mold and post cured for an additional three hours at 100° C. Holes for securing the scraper bar 14 were then drilled. There was no bowing in the finished scraper bar.

Straight scraper bars up to 96 in. in length have been fabricated using the technique of the present invention without any appreciable bowing.

While the broad outline of the present invention has been disclosed in the foregoing specification and descriptive illustrations and embodiments, other embodiments evident to those skilled in the art are considered to be within the scope of the present invention, such scope to be determined from the following claims.

We claim:

1. An elongated scraper bar for use with conveyor belting and the like including a first layer formed from hard, abrasion resistant pellets embedded in elastomer to make an elastomer/pellet matrix, a second layer of elastomer without such pellets, and an elongated insert of rigid material embedded in said second layer, said second layer in the absence of said insert having a tendency to shrink after demolding which is greater than the tendency of said pellet-containing first layer of elastomer to shrink after demolding, whereby said insert inhibits differential shrinkage-caused bowing and warpage of the scraper bar upon demolding.

2. The scraper bar of claim 1 wherein one edge of the elongated insert is positioned along the interface between the first layer and the second layer.

3. The scraper bar of claim 2 wherein the unmatrixed layer of elastomer and the insert have coextensive holes positioned along their respective lengths for mounting the scraper bar.

4. The scraper bar of claim 1 wherein the insert is formed from a non-metallic material.

5. The scraper bar of claim 1 wherein the pellets are formed from a ceramic material and the elastomer used in said first and second layer is an urethane.

6. The scraper bar of claim 1 wherein the insert is formed from particle board.

7. The scraper bar of claim 1 wherein the insert is formed from chipboard.

8. The scraper bar of claim 1 wherein the insert is formed from plywood.

9. The scraper bar of claim 1 wherein the insert is formed from fibreglass reinforced plastic sheeting.

* * * * *